US005742757A

United States Patent [19]

Hamadani et al.

[11] Patent Number: 5,742,757
[45] Date of Patent: Apr. 21, 1998

[54] AUTOMATIC SOFTWARE LICENSE MANAGER

[75] Inventors: Mehrdad Hamadani; Ward Huffman, both of Durham, N.C.

[73] Assignee: Mitsubishi Semiconductor America, Inc., Durham, N.C.

[21] Appl. No.: 655,132

[22] Filed: May 30, 1996

[51] Int. Cl.[6] .................................................. G06F 11/00
[52] U.S. Cl. .......................... 395/186; 380/25; 364/222.5; 364/286.4
[58] Field of Search .................... 395/186, 187.01, 395/188.01, 701, 704, 209, 670, 491, 726; 380/3, 4, 23, 25; 364/222.5, 286.4, 286.5, 260.81

[56] References Cited

U.S. PATENT DOCUMENTS

| | | | |
|---|---|---|---|
| 4,924,378 | 5/1990 | Hershey et al. | 364/228.3 |
| 4,937,861 | 6/1990 | Robert et al. | 380/4 |
| 4,937,863 | 6/1990 | Robert et al. | 380/5 |
| 5,103,476 | 4/1992 | Waite et al. | 380/4 |
| 5,138,712 | 8/1992 | Corbin | 395/700 |
| 5,204,897 | 4/1993 | Wyman | 380/4 |
| 5,222,134 | 6/1993 | Waite et al. | 380/4 |
| 5,239,648 | 8/1993 | Nukui | 395/600 |
| 5,260,999 | 11/1993 | Wyman | 384/4 |
| 5,375,206 | 12/1994 | Hunter et al. | 395/200 |
| 5,386,369 | 1/1995 | Christiano | 364/454.01 |
| 5,390,297 | 2/1995 | Barber et al. | 395/200 |
| 5,438,508 | 8/1995 | Wyman | 364/401 |
| 5,553,143 | 9/1996 | Ross et al. | 380/25 |

*Primary Examiner*—Robert W. Beausoliel, Jr.
*Assistant Examiner*—Dieu-Minh Le
*Attorney, Agent, or Firm*—Lowe, Price, LeBlanc & Becker

[57] ABSTRACT

A software license management system that assists a user at a local node of a computer network in selecting an appropriate type of software licenses available at the time of a request. When the user requests a license for a required software tool, the system determines whether a node-locked license assigned to its node is available. If not, the system determines whether a floating license for the required software tool is available. If no floating or local node-locked license is available, the system finds out whether a node-locked license assigned to a remote node of the network can be used. If so, the user is connected to the remote node to use that node-locked license. If no license for the required software tool is available at the time of the request, the request is placed on a license request queue for the required software tool. The user is notified in order of the queue when any license for the required software tool becomes available.

9 Claims, 3 Drawing Sheets

AUTOMATIC SOFTWARE LICENSE MANAGER

TECHNICAL FIELD

The present invention relates to controlling the use of licensed computer programs, and more particularly, to managing licenses for a computer program in a computer network.

BACKGROUND ART

Various software protection system have been developed to prevent unauthorized use of computer programs. For example, a unique identification (ID) number may be assigned to a program run by a stand-alone computer. To access the program, a user is requested to enter the ID number. A software license is provided to authorize the execution of a computer program. The license data may be used to compare the ID number entered by the user with the program's ID number.

Another method of preventing unauthorized software access requires a computer to be equipped with a hardware board that stores an ID code. A protected computer program should carry a matching code in order to be executed at that computer. A node-locked software license enables a computer program to be used at one fixed computer.

In a multi-user computer network, it is normally not necessary to run an application program on all of the computers. Therefore, a company with a computer network may purchase a floating software license that allows a particular application program to be run on any computer in the network. In this case, the number of computers permitted to run a program is limited to the number of floating licenses granted for the program. When a workstation needs an application program, it sends to a network server a request for a floating license to run the program. If no floating license is available, the request is rejected.

To provide a flexible network environment, the use of floating licenses in a computer network may be combined with the use of node-locked licenses assigned to particular nodes of the network. In such networks, if no floating license is available for a required software product, a requester may investigate whether a node-locked license for the use of the required product is available at any node of the network. However if no node-locked license is available at the time of the request, the requester must keep checking to determine whether any license for the required program has been released by another user.

Thus, an engineering workstation (EWS) at any node of a computer network may use a node-locked license assigned to its node, a node-locked license assigned to any other node of the network, or a floating license. It would be desirable to provide an automatic system to assist a workstation in selecting an appropriate type of software license available at the time of a request. For example, if the workstation's node-locked license is not occupied by a user at another node, it would be desirable for the workstation to use its own node-locked license. If this license is not available, the next choice would be a floating license because it does not require a workstation at a remote node to be used. However, if none of the above-mentioned licenses is available, the workstation would request a node-locked license assigned to any other node of the network.

Further, it would be desirable to provide an automatic system for monitoring the availability of software licenses to notify a requester when a license becomes available.

DISCLOSURE OF THE INVENTION

One advantage of the invention is in providing an automatic software license management system that assists a license requester in selecting an appropriate type of software license available at the time of a request.

Another advantage of the invention is in providing an automatic software license management system that monitors the availability of software licenses and notifies a license requester when a license becomes available.

The above and other advantages of the invention are achieved, at least in part by providing a system for managing software licenses that comprises a license storage for storing node-locked and floating licenses for software items run by various computers in a computer network. A license selector coupled to the license storage provides a requesting computer with a node-locked license for a required software item assigned to this computer if the node-locked license is available. The computer is provided with a floating license for the required software item if the node-locked license is not available.

In accordance with a first aspect of the invention, the license selector provides the requesting computer with a node-locked license for the required software item assigned to a remote computer in the network, when other types of licenses are not available.

In accordance with a second aspect of the invention, a queuing manager places a license request for a required software item on a queue if neither the node-locked license nor the floating license for the software item is available. The requesting computer is notified in order of the queue when any of the licenses becomes available. The queuing manager maintains the queue in accordance with priorities of license requests.

In accordance with a further aspect of the invention, a license memory stores a license availability table indicating which licenses on a software item are available. The license availability table is generated by a storage monitor that searches the license storage.

In accordance with the method of the present invention, the following steps are carried out:

sending by a computer at a computer network node a request for a license for a software tool, determining whether a local node-locked license for the software tool assigned to the computer is available, enabling the computer to run the software tool, if a local node-locked license is available, determining whether a floating license for the software tool is available, if a local node-locked license is not available, enabling the computer to run the software tool, if a floating license is available, determining whether a remote node-locked license for the software tool assigned to a remote computer in the computer network is available, if a floating license is not available, and enabling the computer to run the software tool through said remote computer, if a remote node-locked license is available.

Preferably, if a remote node-locked license is not available, the request is placed on a queue of requests for the software tool. The computer is notified in order of the queue when the license for the software tool becomes available. The queue may be maintained in accordance with priorities of the requests in the queue.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Although the invention has general applicability in the field of software license management, the best mode for practicing the invention is based in part on the realization of a computer network that uses a combination of node-locked and floating software licenses.

Figure 1:
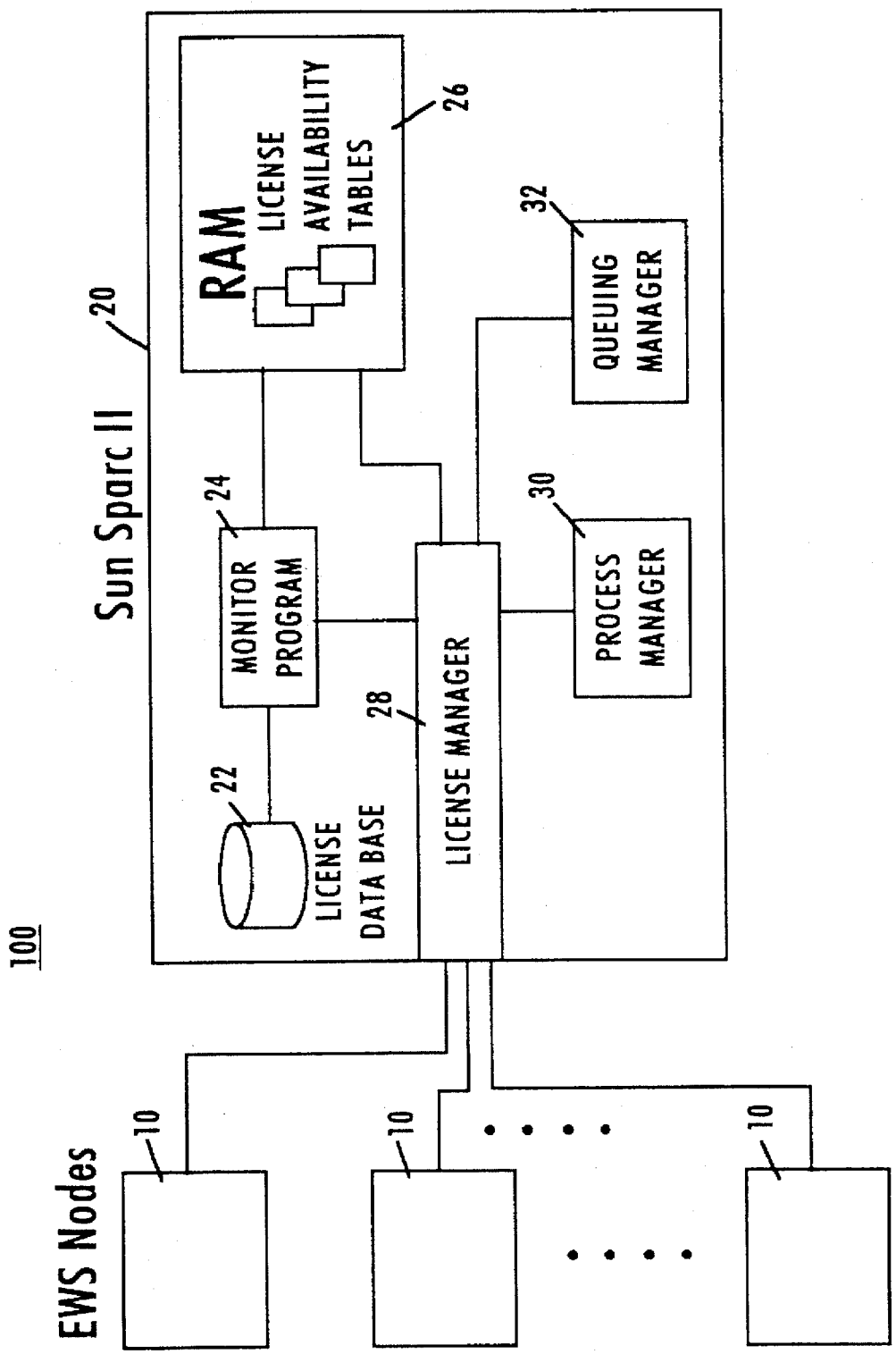
FIG. 1 illustrates a computer network having a software license management system of the present invention.

Reference is now made to FIG. 1, wherein a software license management system is implemented in a computer network 100 that comprises a plurality of engineering workstations (EWSs) 10 located at various nodes of the network 100. The EWSs 10 are coupled to a central computer 20, for example, to a Sun Sparc II computer platform. The central computer 20 may comprise a license data base 22 that stores all of the node-locked and floating software licenses available in the network 100. A monitor program 24 monitors the data base 22 to find a license for a requested software tool. Data relating to licenses available to run the requested software tool are placed into license availability tables stored in a random-access memory (RAM) 26. A custom license manager 28 receives license requests from the EWSs 10 and controls a license distribution procedure. A process manager 30 is responsible for initiating a remote process to use a node-locked license available at a remote EWS 10. A queuing manager 32 maintains a queue of license requests if a required license is not available at the time of a request. The license management system is discussed in more detail below.

Figure 1A:
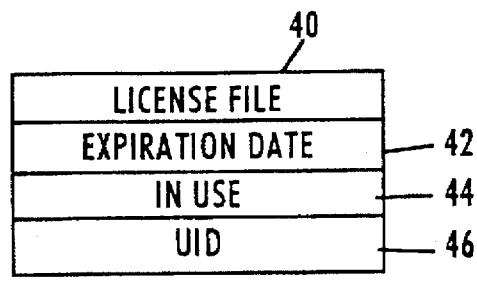
FIGS. 1A and 1B respectively show examples of license and computer program files in the license data base shown in FIG. 1.
Figure 1B:
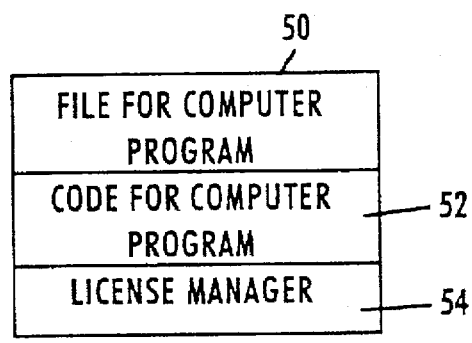

Each of the licenses in the license data base 22 may be represented by a license file 40 and a computer program file 50 respectively illustrated in FIGS. 1A and 1B. Formats for the license file 40 and computer program file 50 are defined by various software vendors. For example, the license file 40 may contain an expiration date field 42 that indicates the date until which the license is valid. An in-use field 44 indicates whether or not the license is currently occupied. A unique identification (UID) field 46 contains identification data assigned to the license.

The computer program file 50 contains a code 52 representing the software tool for which the license is assigned. For example, the software tool may be a standard application program. Also, the computer program file 50 comprises a license manager computer program 54 provided by a software vendor. For example, the FLEX LM program may be used as the license manager computer program. The license manager computer program 54 handles a use authorization procedure for the licensed software tool. When the license is checked out from the license data base 22, the license manager program 54 updates the in-use field 44 to indicate that the license is occupied. When the license is checked in, the license manager program 54 indicates in the in-use filed 44 that the license is available.

Figure 1C:
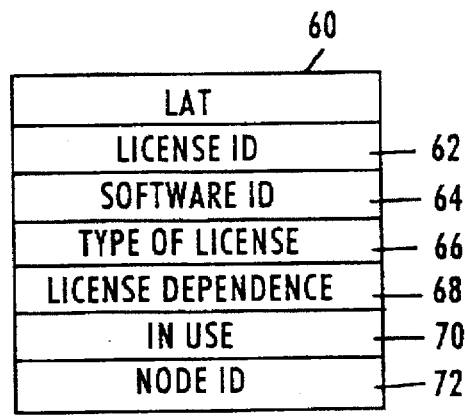
FIG. 1C presents an example of a license availability table in the RAM shown in FIG. 1.

In response to a license request from a EWS 10, the custom license manager 28 controls the monitor program 24 to search the license data base 22 for software licenses available to run a software tool required by the requesting EWS 10. As discussed above, the license data base 22 stores license data in formats defined by various software vendors. The monitor program 24 is a C language-based computer program that transforms the uncovered software license data into a format appropriate for EWSs 10 in the network 100, and writes the data of all available floating and node-locked licenses for the required software tool into the license availability tables in the RAM 26. As shown in FIG. 1C, for each license for the required software tool, a license availability table (LAT) 60 in the RAM 26 may contain a license ID field 62 that identifies the license, a software ID field 64 that identifies the licensed software tool, a type of license field 66 that indicates whether the license is a node-locked or floating license, a license dependence field 68 that shows whether or not the license depends from a base software license, an in-use field 70 that indicates whether or not the license or its base license is currently occupied, and a node ID field 72 that identifies a node to which the license is assigned, if the type of license field 66 indicates that the license is a node-locked license. The base software license is a license for a software program needed to run the required software tool. When the base license is not available, the in-use field indicates that the required license is occupied.

The custom license manager 28 accesses the license availability tables 60 to determine which licenses for the required software tool are available, and which nodes have their node-locked licenses for the required tool. If a software license is found to be available, the custom license manager 28 enables the requesting EWS to receive the licensed software tool identified in the software ID field 64 of the corresponding LAT 60 from the computer program file 50 in the license data base 22. Alternatively, the licensed software tool may be stored at the requesting EWS or any other EWS 10. If a valid non-occupied requested license depends on the unavailable base license, the requested license is considered to be unavailable. The license manager 28 may be a C language-based custom computer program run by the central computer 20 to handle a license distribution procedure for the network 100. The algorithm implemented by the license manager 28 is discussed below in connection with FIG. 2.

The process manager 30 may be a C language-based computer program run by the central computer 20 to enable a requesting EWS 10 to run the required software tool on a remote EWS 10 using a node-locked license assigned to the remote EWS. The queuing manager 32 maintains a license request queue composed of requests for an unavailable software license from various EWSs 10. When the in-use field 44 in the license file 40 indicates that a requested software license becomes available, the license manager 28 looks at the license request queue to determine which of the requesting EWSs 10 should be notified about the license availability. The requests are put on the license request queue in accordance with their priorities established by the queuing manager 32. The priority of requests may depend, for example, on the hierarchy of the EWSs 10 in the network 100. The queuing manager 32 may be a C language-based computer program run by the central computer 20.

Figure 2:
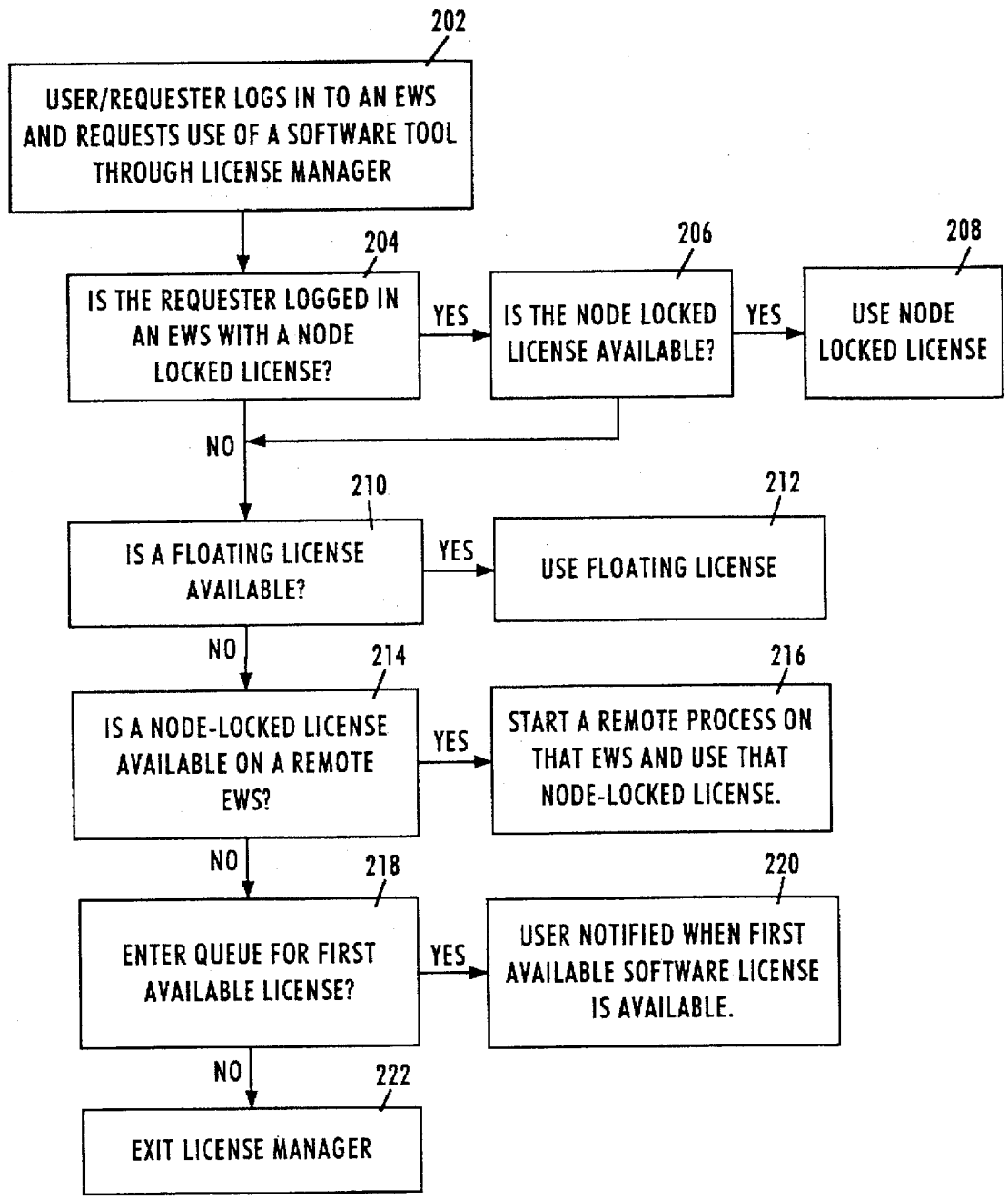
FIG. 2 is a flow-chart of a software license management procedure of the present invention.

Referring to FIG. 2, the operation of the software license management system is as follows. As shown in step 202, a user logs in to one of the EWSs 100 (FIG. 1), and requests a software license for the use of a particular computer program or other software tool. In response to the request, the custom license manager 28 looks at the license availability tables 60 generated by the monitor program 24 for the required software tool to determine whether the requesting EWS 10 has a node-locked software license for the required software tool (step 204).

If so, the license manager 28 checks the in-use field 70 of LAT 60 for the node-locked software license assigned to the requesting EWS 10 to determine whether or not the license is occupied by another EWS 10 (step 206). If the node-locked license is available, the requester is allowed to use it (step 208).

If the node-locked software license assigned to the requesting EWS 10 is occupied by another EWS 10, or if the requesting EWS 10 does not have a node-locked license for the required software tool, the license manager 28 searches the license availability tables to determine whether a floating license for the required software tool is available (step 210). If the floating license is available, the requester is allowed to use it (step 212).

If the floating license is not available, in step 214, the license manager 28 reads the license availability tables in the RAM 26 to find out whether the network 100 has a node-locked license for the required software tool assigned to any EWS 10 remote with respect to the requesting EWS 10. If the node-locked license assigned to a remote EWS 10 is available, the license manager 28 requests the process manager 30 to initiate a connection between the requesting EWS 10 and the remote EWS 10 in order to run the required software tool using the remote EWS node-locked license (step 216).

If no node-locked license at a remote EWS 10 is available, the queuing manager 32 establishes the priority of the license request, and places the request on a license request queue for the required software tool in accordance with the request priority (step 218). The monitor program 24 continues monitoring the license data base 22 to detect when any license for the required software tool becomes available. When the license manager 28 receives information that the license is available, it allows the first request in the queue to be served. The license manager 28 notifies the requesting EWS 10 when its request can be served in order of the queue (step 220), to enable the requester to use the first available license for the required software tool. If the user does not want to wait until the requested license becomes available, the requesting EWS 10 may exit the license manager program (step 222).

There accordingly has been described an automatic software license management system that assists a user at a local node of a computer network in selecting an appropriate type of software licenses available at the time of a request. When the user requests a license for a required software tool, the system determines whether a node-locked license assigned to its node is available. If not, the system determines whether a floating license for the required software tool is available. If no floating or local node-locked license is available, the system finds out whether a node-locked license assigned to a remote node of the network can be used. If so, the user is connected to the remote node to use that node-locked license. If no license for the required software tool is available at the time of the request, the request is placed on a license request queue for the required software tool. The user is notified in order of the queue when any license for the required software tool becomes available.

In this disclosure, there are shown and described only the preferred embodiments of the invention, but it is to be understood that the invention is capable of changes and modifications within the scope of the inventive concept as expressed herein.

We claim:

1. A system for managing software licenses in a computer network having a plurality of user nodes, comprising:
    a license storage for storing node-locked and floating licenses for software items run by the user nodes,
    a license selector coupled to the license storage for providing a terminal at one of the user nodes with any available node-locked license assigned to said terminal, and for providing the terminal with a floating licenses if no node-locked license is available, and
    a queuing manager responsive to the license selector for placing a license request for a software item required by said terminal on a queue if neither a node-locked license nor a floating license for the required software item is available,
    wherein said terminal is notified in order of the queue when any software license for the required software item becomes available.

2. The system of claim 1, further comprising a user node monitor for determining which of the software items are used by the user nodes.

3. The system of claim 2, wherein said license selector is responsive to said user node monitor for providing said terminal with the node-locked licenses assigned to remote terminals, when a node-locked license assigned to said terminal and a floating license are not available.

4. The system of claim 1, wherein said queuing manager maintains the queue in accordance with priorities of requests from the user nodes.

5. The system of claim 1, further comprising a license memory for storing a license availability table indicating which licenses on a software item are available.

6. The system of claim 5, further comprising a storage monitor for searching said license storage to generate the license availability table.

7. A method of software license management in a computer network having a plurality of nodes using node-locked software licenses and floating licenses for various software tools, the method comprising the steps of:
    sending by a computer at one of the nodes a request for a license for a software tool,
    determining whether a local node-locked license for the software tool assigned to said computer is available,
    enabling said computer to run the software tool, if the local node-locked license is available,
    determining whether a floating license for the software tool is available, if a local node-locked license is not available,
    enabling said computer to run the software tool, if a floating license is available,
    determining whether a remote node-locked license for the software tool assigned to a remote computer in the computer network is available, if a floating license is not available, enabling said computer to run the software tool through said remote computer, if a remote node-locked license is available, placing the request on queue of requests for the software tool, if a remote node-locked license is not available, and notifying said computer in order of the queue when a license for the software tool becomes available.

8. The method of claim 7, wherein the queue is maintained in accordance with priorities of the requests in the queue.

9. A system for managing software licenses in a computer network having a plurality of user nodes, comprising:

a license storage for storing node-locked and floating licenses for software items run by the user nodes, a license selector coupled to the license storage for providing a terminal at one of the user nodes with any available node-locked license, and for providing the terminal with a floating licenses if no node-locked license is available, and a queuing manager responsive to the license selector for placing a license request for a software item required by said terminal on a queue if neither a node-locked license nor a floating license for the required software item is available, wherein said queuing manager maintains the queue in accordance with priorities of requests from the user nodes.

* * * * *